UNITED STATES PATENT OFFICE.

FREDERICK W. TAYLOR, OF SOUTH BETHLEHEM, AND MAUNSEL WHITE, OF BETHLEHEM, PENNSYLVANIA, ASSIGNORS, BY DIRECT AND MESNE ASSIGNMENTS, TO THE BETHLEHEM STEEL COMPANY, OF SOUTH BETHLEHEM, PENNSYLVANIA.

METAL-CUTTING TOOL AND METHOD OF MAKING SAME.

SPECIFICATION forming part of Letters Patent No. 668,269, dated February 19, 1901.

Application filed October 20, 1899. Serial No. 734,263. (No model.)

*To all whom it may concern:*

Be it known that we, FREDERICK W. TAYLOR, residing in South Bethlehem, and MAUNSEL WHITE, residing in Bethlehem, in the county of Northampton, in the State of Pennsylvania, citizens of the United States of America, have invented a new and useful Metal-Cutting Tool and Method of Making the Same, of which the following is a true and exact description.

Our invention relates to the manufacture of tools for cutting metals or similar uses where the tool is highly heated in performing its work.

The object of our invention is to provide a tool capable of working at a higher temperature and consequently of doing more work in a given time or running at a higher cutting speed than are tools as heretofore made.

Metal-cutting tools have heretofore been made of both carbon tool-steels and what are known as "self-hardening" or "air-hardening" steels, the latter having the property of working at higher temperatures than the carbon steel and of assuming a known degree of hardness on being heated to a determined degree whether cooled rapidly or slowly, while the carbon steels after being heated to degrees depending on their composition are hardened by their being suddenly cooled, as by plunging in water, and then subjected to the treatment known as "drawing the temper" to reduce their hardness to a proper degree and impart the necessary toughness to the tool. In the treatment of both classes of steel it has always been recognized that what is known as "overheating," either in making, dressing, or treating the tool, is to be carefully avoided under penalty of most material injury to the tool, and the points at which overheating occurs are carefully studied and well recognized in the trade. In the case of the air-hardening steels the maximum temperature considered permissible is that indicated by a bright cherry red, which color we have found by careful observation to indicate from 1,500° to 1,550° Fahrenheit. Above this temperature tools made of air-hardening steel rapidly deteriorate, and all makers of such steel are careful to caution their customers not to heat such tools above this temperature. It has also been found in practice that at the higher range of temperatures below the bright cherry red to which air-hardening steel tools are subjected in making and dressing there are great irregularities in the hardness and durability of the tools, and particularly in their capacity to remain efficient at high working temperatures caused by their use in cutting metals. Consequently such tools must, as a rule, be run at a less rate of cutting speed than individual tools are capable of without injury, because practically similar treatments of tools made from the same steel cannot and do not insure similar heat-resisting qualities while working. Our invention is based on our discovery that while it is true that tools made of air-hardening steels all rapidly deteriorate at temperatures in excess of a bright cherry rod (though it must be understood not all at the same temperature) it is also true that when air-hardening steels are made with certain constituents in ascertained proportions this deterioration only prevails during a limited range of temperature above the bright cherry red—that is to say, from about 1,550° to about 1,700° Fahrenheit (corresponding to a light salmon color)—and on our further discovery that above this range of temperatures, which we call the "breaking-down point," and from 1,725° Fahrenheit up to a temperature at which the steel softens or crumbles when touched with a rod (approximately 1,900° to 2,000° Fahrenheit) the efficiency of tools of such special steels—that is to say, their cutting speed and also their uniformity in efficiency—is greatly increased and largely so in proportion to the degree of heat to which they are raised. This is so much the case that their cutting speed may be stated to be from one and one-half to two and a half times that of the tool heated, as heretofore, to temperatures below the breaking-down point.

In order to provide an air-hardening steel suitable for our treatment, it is necessary that it should be compounded with chromium in the proportion of at least one-half of one per cent. and another or other members of the commercially available members of the chromium group of metals in the proportion of at least one per cent.—that is to say, with either tungsten or molybdenum or a mixture of tungsten and molybdenum in the proportion of at least one per cent. While we have found that to produce a markedly beneficial result from our treatment it is necessary to use at least one-half of one per cent. of chromium in combination with at least one per cent. of tungsten or molybdenum or a mixture of these substances, we have also found that materially better results are secured where chromium is present in the proportion of one or more per cent. and tungsten in the proportion of four or more per cent., or, in the alternative, molybdenum present in the proportion of two or more per cent., or, again, tungsten present in the proportion of two per cent. or over, together with molybdenum in the proportion of one per cent. or over. Our experiments have shown that with respect to the cutting speed of the tool molybdenum replaces tungsten in the proportion of about one to two, though it is proper to note that in other respects we find the tungsten steels preferable. We have not found any very material difference in the cutting speed of the tool in cases where the chromium and tungsten or molybdenum are used in excess of the percentages last given, though we have experimented with chromium as high as four per cent., with tungsten as high as nine per cent., and with molybdenum as high as four and three-quarters per cent.

With regard to the carbon contents of the steels used by us we have not found it to be a material factor. We have worked with steels containing carbon from .85 per cent. to 2.00 per cent. without noticeable difference in the character of the tool produced by our treatment. As an example of a steel composition which we have found to give excellent results when treated by our method we may cite one in which the iron is associated with the following percentages of other ingredients, to wit: carbon, 1.85; chromium, 2.00; tungsten, 8.50; manganese, .15; silicon, .15; phosphorus, .025; sulfur, .030. We do not feel able to state with certainty the chemical and molecular changes which occur in steels of this composition when heated above the breaking-down point and to the high heat characteristic of our process, but will mention as one characteristic change due to our treatment that the tools after exposure to the high heat show by analysis a smaller percentage of carbid of chromium than exists in the steel before such treatment. For example, in steels containing one and one-half per cent. of chromium and seven-tenths per cent. of carbid of chromium the tool after treatment contained but two-tenths per cent. of carbid of chromium, and in steels containing three and three-fourths per cent. of chromium and nine-tenths per cent. of carbid of chromium the treated tool contained but three-tenths per cent. of carbid of chromium. Again, air-hardening steels of this composition, like air-hardening steels in general, possess in their normal condition the characteristically fine velvety grain when fractured. The higher range of temperatures necessary in our treatment has a very noticeable tendency to change the structure of the metal and to give a non-velvety appearance and coarser grain, frequently interspersed with sparkling grains. When treated with the higher heats and to obtain the best results, the steel of the tools show under the microscope a distinctly larger grained structure in many cases interspersed with austenite, a micro-constituent of steel discovered by Osmond, the chemical composition of which is unknown and which according to the best authorities has never been met with in the industrial treatment of steel.

In cutting the softer steels our tools will effectually operate and maintain their cutting edge at temperatures at or verging on incandescence, those subjected to the preferred treatment described maintaining their cutting edges even at a red heat clearly visible in daylight.

The efficiency or cutting speed of tools treated by our process increases with the temperature to which they are subjected during the treatment above the breaking-down point. This is noticeably true from temperatures of 1,725° to 1,850° Fahrenheit; but when heated above 1,850° Fahrenheit and from this temperature to the point where the steel softens or crumbles when touched the increase in cutting speed of the tool is very striking, reaching its maximum at these higher temperatures.

While for cutting most metals tools made and treated by our method work as well whether they are cooled from the "high heat" to which we subject them rapidly or slowly for cutting certain kinds of metals, among which may be mentioned especially hard metals, we have found that the tools can be run at a higher cutting speed when they are cooled rapidly from the high heat to a point below the "breaking-down temperature"—that is, below 1,550° Fahrenheit or preferably below a bright cherry red. This is conveniently done by plunging the tool at its high heat into a lead-bath maintained at a temperature below the breaking-down point, and after the temperature of the tool has fallen to that of the bath it is taken out and cooled rapidly or slowly, as may be desired. It is important, however, that in the cooling down of the tool its temperature should be either stationary or falling at all times during the cooling-down period after it begins to fall through what we have termed the "breaking-down point" and until it reaches 1,240° Fahrenheit, because the valuable qualities imparted by the high heat are impaired by even a slight and temporary rise in temperature within these limits and during the cooling down from the high heat.

In practicing our invention we have found it advantageous to treat certain tools preparatory to subjecting them to the high heat by coating them with a protecting-covering which at the high heat will melt and cover the part of the tool being treated with a film which will exclude air or other gases which might injuriously affect the surface of the tool. A fusible slag we have found to afford the best coating for the purpose, and we have also found that where such a slag coating is used it is particularly advantageous to cool the tool rapidly from the high heat to a point below the breaking-down point by quenching it in a lead-bath maintained at the proper temperature or in a blast of air. Suitable slags may be made of two parts powdered glass and one part German clay, or of two parts powdered glass and one part Downer's sand, or of thirty parts ordinary river-sand, ten parts soda-ash, ten parts fluor-spar, and two parts borax. The slags should first be fused into a glass which is powdered fine before use.

Another discovery upon which our invention is in part based is that the cutting speed of our tools treated at the high speed is materially increased by holding the tool for several minutes at a temperature between 450° and 1,350° Fahrenheit—for the best results between 700° and 1,240° Fahrenheit. This can be effected by checking the cooling of the tool after its temperature has fallen below 1,350° Fahrenheit and maintaining it at the desired point or points for the requisite time or preferably by reheating the tool and holding it at the point or points determined upon. This supplemental treatment we call the "low-heat" treatment, and it must be noted that in this low-heat treatment the tools, if raised above 1,240° Fahrenheit and from that up to 1,350° Fahrenheit, must be maintained at such temperatures for only a very short time, while below 1,240° Fahrenheit no deterioration takes place by exposure to the chosen heat for a long time, and we prefer an exposure of at least five minutes, and with the lower range of temperatures even longer exposure is advisable.

From what we have said it will be understood that when the low-heat treatment is practiced by checking the cooling of the tool from the high heat the tool should be allowed to cool quickly to a temperature below the breaking-down point and then cooled slowly while passing through the upper temperatures corresponding to the low-heat treatment.

The beneficial effects of the second or low-heat treatment can be secured in measurable degrees by heating the tool in a lathe, the necessary temperature being attained by the friction of the chip on and above the cutting edge of the tool.

In treating tools by our process the high heats employed have a tendency to slightly deteriorate the outer portions of the metal of the tool. Consequently it is advisable, if not necessary, that the deteriorated metal should be ground off after treatment of the tool and before its use.

From what we have said it will be understood that our treatment consists, primarily, in treating tools made of air-hardening steel having the peculiarities of composition specified by heating them to temperatures above those corresponding to the breaking-down point and comprised within those specified as indicating what we call "high heat," preferably at the higher range of such temperatures.

Secondarily, our invention consists in treating the tools after exposure to the high heat to protracted exposure at temperatures comprised within the specified range of low-heat temperatures, preferably at temperatures between 700° and 1,240° Fahrenheit.

Another distinct step in our treatment consists in the rapid cooling of the tool from the high heat below the breaking-down point.

We may mention, though this will be apparent to those skilled in the art, that the high heat of our treatment can be taken as the last heat in forging the tool.

It is well known to those skilled in the art that the accurate determination of the higher range of temperatures is a matter of considerable difficulty and of some uncertainty. The temperatures noted by us were ascertained with the greatest care and by the aid of the most accurate pyrometer. The error, if any, in our stated temperatures will be found on the low side and within, we are confident, a range of not more than 25°.

Having now described our invention, what we claim as new, and desire to secure by Letters Patent, is—

1. The method of producing a metal-cutting tool adapted to retain its efficiency at high temperature which consists in forming the tool of air-hardening tool-steel containing not less than one-half of one per cent. of chromium and not less than one per cent. of one or more of the above-specified members of the chromium group, and heating it or its cutting portion up to the temperature at which the steel softens or crumbles when touched with a rod.

2. The described metal-cutting tool made of air-hardening tool-steel containing not less than one-half of one per cent. of chromium and not less than one per cent. of another or others of the specified members of the chromium group of metals, said tool or its cutting edge being characterized as described by a considerable reduction in its contained carbid of chromium as compared with that contained in the steel from which it is made and by its capacity to maintain its cutting edge in cutting the softer steels at temperatures at or verging on incandescence.

3. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, and heating it or its cutting portion to a temperature of or over 1,725° Fahrenheit.

4. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, and heating it or its cutting portion to a temperature of or over 1,850° Fahrenheit.

5. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,725° Fahrenheit and then cooling the tool rapidly to a temperature below 1,550° Fahrenheit.

6. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,850° Fahrenheit and then cooling the tool rapidly to a temperature below 1,550° Fahrenheit.

7. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,725° Fahrenheit, then cooling the tool and then reheating it to a temperature above 450° Fahrenheit and below 1,350° Fahrenheit.

8. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,725° Fahrenheit then cooling the tool and then reheating it to a temperature above 700° Fahrenheit and below 1,240° Fahrenheit.

9. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of over 1,725° Fahrenheit then cooling the tool to a temperature of not over 1,240° Fahrenheit and afterward maintaining the tool at temperatures between 1,240° and 450° Fahrenheit for several minutes.

10. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of over 1,725° Fahrenheit then cooling the tool to a temperature of not over 1,240° Fahrenheit and afterward maintaining the tool at temperatures between 1,240° and 700° Fahrenheit for several minutes.

11. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,725° Fahrenheit then cooling the tool rapidly to a temperature below 1,550° Fahrenheit and afterward maintaining the tool at temperatures between 1,350° and 450° Fahrenheit for several minutes.

12. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, heating it or its cutting portion to a temperature of or over 1,725° Fahrenheit, then cooling the tool rapidly to a temperature below 1,550° Fahrenheit and afterward maintaining the tool at temperatures between 1,240° and 700° Fahrenheit for several minutes.

13. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, coating the portion of the tool to be treated with a fusible slag and then heating the tool to a temperature over 1,725° Fahrenheit and sufficient to melt the slag coating.

14. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, coating the portion of the tool to be treated with a fusible slag, heating the tool to a temperature over 1,725° Fahrenheit and sufficient to melt the slag coating and then cooling the tool rapidly to a temperature below 1,550° Fahrenheit.

15. The method of producing a metal-cutting tool adapted to retain its efficiency at high temperatures which consists in forming the tool of air-hardening tool-steel containing not less than one-half of one per cent. of chromium and not less than one per cent. of one or more of the other specified members of the chromium group, coating the portion of the tool to be treated with a fusible slag, heating the tool to a temperature over 1,725° Fahrenheit and sufficient to melt the slag coating and then cooling the tool rapidly by immersion in a fused metallic bath to a temperature below 1,550° Fahrenheit.

16. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, and heating it or its cutting portion to a temperature of or over 1,725° Fahrenheit.

17. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, and heating it or its cutting portion to a temperature of or over 1,850° Fahrenheit.

18. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,725° Fahrenheit and then cooling the total rapidly to a temperature below 1,550° Fahrenheit.

19. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,850° Fahrenheit and then cooling the tool rapidly to a temperature below 1,550° Fahrenheit.

20. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,725° Fahrenheit, then cooling the tool and then reheating it to a temperature above 450° and below 1,350° Fahrenheit.

21. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,725° Fahrenheit then cooling the tool and then reheating it to a temperature above 700° and below 1,250° Fahrenheit.

22. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of over 1,725° Fahrenheit then cooling the tool to a temperature of not over 1,240° Fahrenheit and afterward maintaining the tool at temperatures between 1,240° and 450° Fahrenheit for several minutes.

23. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of over 1,725° Fahrenheit then cooling the tool to a temperature of not over 1,240° Fahrenheit and afterward maintaining the tool at temperatures between 1,240° and 700° Fahrenheit for several minutes.

24. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,725° Fahrenheit then cooling the tool rapidly to a temperature below 1,550° Fahrenheit and afterward maintaining the tool at temperatures between 1,350° and 450° Fahrenheit for several minutes.

25. The method of producing a metal-cutting tool adapted to retain its efficiency at high temperatures which consists in forming the tool of air-hardening tool-steel containing not less than one per cent. of chromium and one or more of the other specified members of the chromium group in amount equal to not less than four per cent. of tungsten, heating it or its cutting portion to a temperature of or over 1,725° Fahrenheit then cooling the tool rapidly to a temperature below 1,550° Fahrenheit and afterward maintaining the tool at temperatures between 1,240° and 700° Fahrenheit for several minutes.

FREDERICK W. TAYLOR.
MAUNSEL WHITE.

Witnesses:
 EDWARD J. MALLOY,
 HAMOND S. HESS.